United States Patent [19]

Nakano et al.

[11] Patent Number: 5,223,576

[45] Date of Patent: Jun. 29, 1993

[54] THERMOPLASTIC RESIN COMPOSITION

[75] Inventors: Hiroshi Nakano; Takayuki Inoue; Shiroh Gotoh; Michiharu Kihira, all of Yokkaichi, Japan

[73] Assignee: Mitsubishi Petrochemical Company, Ltd., Tokyo, Japan

[21] Appl. No.: 788,110

[22] Filed: Nov. 5, 1991

[30] Foreign Application Priority Data

Nov. 9, 1990 [JP] Japan .................................. 2-302771

[51] Int. Cl.$^5$ .............................................. C08L 71/12
[52] U.S. Cl. ..................................... 525/133; 525/132; 525/905
[58] Field of Search ..................... 525/905, 133, 132

[56] References Cited

U.S. PATENT DOCUMENTS

| 4,127,558 | 11/1978 | Cooper et al. | 524/141 |
| 4,315,084 | 2/1982 | Cooper et al. | 525/68 |
| 4,929,675 | 5/1990 | Abe et al. | 525/905 |
| 4,985,495 | 1/1991 | Nishio et al. | 525/92 |

FOREIGN PATENT DOCUMENTS 0358993 3/1990 European Pat. Off. .
3117049 5/1988 Japan .................................. 525/132

Primary Examiner—James J. Seidleck
Assistant Examiner—Thomas Hamilton, III
Attorney, Agent, or Firm—Oblon, Spivak, McClelland, Maier & Neustadt

[57] ABSTRACT

A thermoplastic resin composition comprises the following components (A) and (B):
component (A): 10 to 90% by weight polyphenylene ether resin,
component (B): 90 to 10% by weight unsaturated copolymer resin obtained by copolymerizing at least one α-olefin having 2 to 12 carbon atoms and a diene compound having 4 to 15 carbon atoms, and containing 0.01 to 50 mol % of diene compound. This resin composition has excellent resistance to organic solvents and superior mechanical properties.

13 Claims, No Drawings

THERMOPLASTIC RESIN COMPOSITION

BACKGROUND OF THE INVENTION

1. Field of the Invention

The present invention relates to a thermoplastic resin composition having excellent resistance to organic solvents and mechanical strength. Particularly, the present invention relates to a resin composition which is produced by mixing a polyphenylene ether resin with an unsaturated copolymer resin composed of an α-olefin and a diene so as to decrease reductions in impact resistance, which, in general, easily occur in incompatible resin mixtures, while barely reducing heat resistance and mechanical strength, both of which are characteristics of polyphenylene ether resins, and the moldability and resistance to organic solvents, both of which are characteristics of polyolefin resins. The resin composition is used as a molding material satisfying high quality requirements for structural members or the like of automobiles and electrical products.

2. Description of the Related Art

Although polyphenylene resins are useful as molding material resins because they have excellent thermal, mechanical and electrical properties, they have disadvantages with respect to processability, resistance to organic solvents and impact resistance and are thus limited in application range. A method of overcoming these disadvantages is disclosed in U.S. Pat. No. 3,383,435 in which the moldability is improved by mixing another resin, e.g., a styrene copolymer. However, this method cannot improve the resistance to organic solvents at all.

On the other hand, various blends with polyolefins having excellent resistance to organic solvents have been investigated, and a blend of polyolefin and a polyphenylene ether resin has been proposed in Japanese Patent Publication No. 42-7069. However, none of the blends sufficiently satisfy the high levels of mechanical strength required in industrial fields. In addition, Japanese Patent Laid-Open Nos. 53-71158, 54-88960 and 59-100159 disclose methods of adding, for example, a block copolymer of styrene and butadiene or a hydrogenation product thereof to a mixture of polyphenylene ether resin and polyolefin for the purpose of improving the compatibility therebetween. However, in these methods, since only small amounts of polyolefin are mixed, the polyphenylene ether resins form a substantially continuous phase, and the resistance to organic solvents possessed by the polyolefins is not sufficiently exhibited. Further, Japanese Patent Laid-Open Nos. 58-103557 and 60-76547 disclose compositions containing a polyphenylene ether resin, at least 20% by weight of polyolefin and a compatibilizing agent such as a diblock copolymer composed of an alkenyl aromatic compound and a conjugated diene, or a hydrogenation product thereof. Although the tensile properties and impact resistance of the compositions are improved, the rigidity and heat resistance thereof do not sufficiently satisfy the required levels.

One of the inventors previously found that a propylene-dialkenylbenzene copolymer which was modified with a styrene monomer and which was obtained by polymerizing, in the presence of a radical polymerization initiator, a styrene monomer with a crystalline propylene-dialkenylbenzene copolymer which was obtained by copolymerizing propylene as a main component and a small amount of alkenylbenzene compound is effective as a modifier for the affinity of a composition containing polyphenylene ether and polypropylene resins. The propylene-dialkenylbenzene copolymer is disclosed in Japanese Patent Laid-Open No. 1-170647.

However, the propylene-dialkenybenzene copolymer modified with a styrene monomer and obtained by copolymerization with a styrene monomer under conditions for radical polymerization is unsatisfactory in the addition effect of styrene. If styrene is added in an amount sufficient for an affinity modifier, although the impact strength is improved, there is the problem that the rigidity, particularly high-temperature rigidity, is reduced due to an increase in the polystyrene component. There is thus a demand for further improving the copolymer.

SUMMARY OF THE INVENTION

It is therefore an object of the present invention to solve the above problems and provide a resin composition having excellent impact strength, mechanical strength and resistance to organic solvents.

To this end, the present invention provides a thermoplastic resin composition consisting of the following components (A) and (B):

Component (A): 10 to 90% by weight polyphenylene ether resin;

Component (B): 90 to 10% by weight unsaturated copolymer resin composed of at least one α-olefin having 2 to 12 carbon atoms and a diene compound having 4 to 15 carbon atoms and containing 0.01 to 50 mol % of diene compound.

It is considered that the affinity between both resins of the composition of the present invention is significantly improved due to the radical reaction between the unsaturated groups of the components (B) and (A) under heating conditions. The composition also has the properties of both polyolefin resin and polyphenylene ether resin and excellent mechanical properties, moldability, dimensional accuracy and solvent resistance. The composition of the invention is thus useful as a molding material.

DETAILED DESCRIPTION OF THE INVENTION

The present invention is described in detail below.

(I) Component

The main components of the resin composition of the present invention are the following components (A) and (B):

Component (A): Polyphenylene ether resin

The polyphenylene ether resin used in the present invention comprises a homopolymer or copolymer having a structure expressed by the following formula:

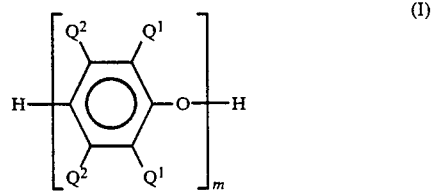

(wherein $Q^1$ denotes a halogen atom, a primary or secondary alkyl group, a phenyl group, an aminoalkyl group, a hydrocarbon oxy group or a halohydrocarbon oxy group; $Q^2$ denotes a hydrogen atom, a halogen atom, a primary or secondary alkyl group, a haloalkyl group, a hydrocarbon oxy group or a halohydrocarbon oxy group; and m denotes a number of 10 or more). Preferable examples of primary alkyl groups shown by $Q^1$ and $Q^2$ include methyl, ethyl, n-propyl, n-butyl, n-amyl, isoamyl, 2-methylbutyl, n-hexyl, 2,3-dimethylbutyl, 2,3- or 4-methylpentyl and heptyl groups. Examples of secondary alkyl groups include isopropyl, sec-butyl and 1-ethylpropyl groups. In many cases, $Q^1$ is an alkyl or phenyl group, particularly an alkyl group having 1 to 4 carbon atoms, and $Q^2$ is a hydrogen atom.

A preferable example of polyphenylene ether resin homopolymers is a homopolymer composed of 2,6-dimethyl-1,4-phenylene ether units. A preferable example of copolymers is a random copolymer composed of the above units and 2,3,6-trimethyl-1,4-phenylene ether units. Many preferable examples of homopolymers and random copolymers are described in various patents and publications. A preferable example of such polymers is a polyphenylene ether resin containing a molecular component which improves the properties such as the molecular weight, melt viscosity and/or impact strength.

The molecular weight of the polyphenylene ether resin is generally about 0.05 to 0.8 dl/g in terms of intrinsic viscosity in chloroform at 30° C.

The polyphenylene ether resin is generally produced by oxidative coupling of the above monomers. Many catalyst systems are known for the oxidative coupling polymerization. Any known catalyst can be selected and used without any particular limit. An example of catalysts contains at least one compound of heavy metal such as copper, manganese, cobalt or the like and other various substances.

Component (B): Unsaturated copolymer resin

The unsaturated copolymer resin used in the present invention comprises a copolymer of an α-olefin having 2 to 12, preferably, 2 to 8, carbon atoms and a diene having 4 to 15 carbon atoms. The diene content of the copolymer resin is 0.01 to 50 mol %, preferably 0.05 to 30 mol %.

The unsaturated copolymer may further contain a comonomer in a small amount of about 15 mol % relative to the total amount of the both monomers.

The unsaturated copolymer must have a molecular weight and/or melting point and glass transition temperature, all of which are sufficient for use as a resin. A typical example of such unsaturated copolymers has a molecular weight of at least 3000 in terms of number average molecular weight or at least a melting point or glass transition temperature of 40° C. or more.

α-olefin

The α-olefins which are components of the unsaturated copolymer resin are α-olefins having 2 to 12 carbon atoms. Examples of such α-olefins include ethylene, propylene, 1-butene, 1-hexene, 3-methyl-1-butene, 3-methyl-1-pentene, 4-methyl-1-pentene, 3,3-dimethyl-1-butene, 4,4-dimethyl-1-pentene, 3-methyl-1-hexene, 4-methyl-1-hexene, 4,4-dimethyl-1-hexene, 5-methyl-1-hexene, allyl cyclohexane, allyl cyclohexane, allyl benzene, 3-cyclohexyl-1-butene, vinyl cyclopropane, vinyl cyclohexane, 2-vinyl bicyclo[2,2,1]-heptane and the like. Of these examples, ethylene, propylene, 1-butene, 1-hexene, 3-methyl-1-butene, 3-methyl-1-pentene, 4-methyl-1-pentene, 3-methyl-1-hexene are preferable. Further, ethylene, propylene, 1-butene, 3-methyl-1-butene and 4-methyl-1-pentene are particularly preferable. These α-olefins may be used singly or in combination of two or more. Particularly, 1-hexene is preferably used as an α-olefin in combination with at least one of ethylene, propylene, 1-butene, 4-methyl-1-pentene and 3-methyl-1-butene. When two or more α-olefins are used, the α-olefins may be distributed either at random or in the form of a block in the unsaturated copolymer resin.

Diene compound

Examples of diene compounds that can be copolymerized with the α-olefin include conjugated dienes each having 4 to 15 carbon atoms, chain or cyclic non-conjugated dienes and mixtures thereof.

Typical examples of such conjugated dienes include the following:

(1) 1,3-dienes such as 1,3-butadiene, isoprene, 1,3-pentadiene, 1,3-hexadiene, 2,4-hexadiene, 2-methyl-1,3-pentadiene, 3-methyl-1,3-pentadiene, 4-methyl-1,3-pentadiene, 2,3-dimethyl-1,3-butadiene, 2,4-heptadiene, 3,4-dimethyl-1,3-pentadiene, 4-methyl-1,3-hexadiene, 5-methyl-1,3-hexadiene, 2,4-dimethyl-1,3-pentadiene, 4-ethyl-1,3-hexadiene, 7-methyl-3-methylene-1,6-octadiene (myrcene), 1-phenyl-1,3-butadiene, 4-phenyl-1,3-pentadiene, 1,4-diphenyl-1,3-butadiene and the like; and (2) dialkenylbenzenes such as divinylbenzene, isopropenylstyrene, divinyltoluene, divinylnaphthalene and the like.

Examples of chain non-conjugated dienes are expressed by the following formula (II):

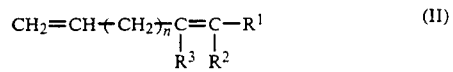

(wherein n denotes an integer of 1 to 10, $R^1$ to $R^3$ each denote H or an alkyl group having at most 8 carbon atoms)

The chain non-conjugated diene preferably has an n of 1 to 5 and $R^1$, $R^2$ and $R^3$ are each a hydrogen atom or an alkyl group having 1 to 4 carbon atoms and which are not hydrogen atoms all at the same time. It is more preferable that n is 1 to 3, $R^1$ is an alkyl group having 1 to 3 carbon atoms, and $R^2$ and $R^3$ are each a hydrogen atom or an alkyl group having 1 to 3 carbon atoms and are not hydrogen atoms at the same time.

Typical examples of such chain non-conjugated dienes include the following:

(1) chain 1,4-dienes such as 2-methyl-1,4-pentadiene, 4-methylidene-1-hexene, 1,4-hexadiene, 4-methyl-1,4-hexadiene, 5-methyl-1,4-hexadiene, 1,4-heptadiene, 4-ethyl-1,4-hexadiene, 4,5-dimethyl-1,4-hexadiene, 4-methyl-1,4-heptadiene, 4-ethyl-1,4-heptadiene, 5-methyl-1,4-heptadiene, 5-methyl-1,4-octadiene and the like;

(2) chain 1,5-dienes such as 1,5-heptadiene, 1,5-octadiene, 5-methyl-1,5-heptadiene, 6-methyl-1,5-heptadiene, 2-methyl-1,5-hexadiene and the like;

(3) chain 1,6-dienes such as 1,6-octadiene, 6-methyl-1,6-octadiene, 7-methyl-1,6-octadiene, 2-methyl-1,6-heptadiene, 6-methylidene-1-octene, 6-ethyl-1,6-octadiene, 6,7-dimethyl-1,6-octadiene, 1,6-nonadiene, 6-ethyl-1,6-nonadiene, 7-methyl-1,6-nonadiene, 7-methyl-1,6-decadiene and the like;

(4) chain 1,7-dienes such as 1,7-nonadiene, 7-methyl-1,7-nonadiene, 8-methyl-1,7-nonadiene, 2-methyl-1,7-octadiene and the like;

(5) chain 1,8-dienes such as 8-methyl-1,8-decadiene, 9-methyl-1,8-decadiene and the like Examples of cyclic non-conjugated dienes include the following:

(1) alkenylnorbornenes such as cyclohexadiene, dicyclopentadiene, methyltetrahydroindene, 5-vinyl-2-norbornene and the like;

(2) alkylidenenorbornenes such as 5-ethylidene-2-norbornene, 5-methylene-2-norbornene, 5-isopropylidene-2-norbornene and the like;

(3) alkenylcyclohexenes such as 6-chloromethyl-5-isopropenyl-2-norbornene, norbonadiene, 4-vinylcyclohexene and the like.

Of these dienes, chain non-conjugated dienes and dialkenylbenzenes are preferable, with 4-methyl-1,4-hexadiene, 5-methyl-1,4-hexadiene, 6-methyl-1,6-octadiene, 7-methyl-1,6-octadiene, isopropenylstyrene and divinylbenzene being particularly preferable.

These dienes may be used singly or in combinations of two or more. A preferable example of a combination of dienes contains 4-methyl-1,4-hexadiene and 5-methyl-1,4-hexadiene (ratio by weight of 95:5 to 5:95). Although crude divinylbenzene which is commercially available is a mixture of meta- and para-divinylbenzene, ethylvinylbenzene and diethylbenzene, the crude divinylbenzene can be used without being separated into these substances.

The unsaturated copolymer resin used as component (B) of the composition of the present invention can be produced by copolymerization of any one of the α-olefins and any one of the dienes in the presence of a Ziegler-Natta catalyst for α-olefin polymerization using the same method and apparatus as those used for producing α-olefin polymers.

The diene compound used may be distributed at random or in the form of a block in the unsaturated copolymer resin.

The content of the diene compound in the unsaturated copolymer resin is 0.01 to 50 mol %, preferably 0.05 to 30 mol %, more preferably 0.5 to 15 mol %. If the content is less than 0.01 mol %, there is the problem that the compatibilizing effect cannot be improved easily because of a low content of unsaturated groups in the unsaturated copolymer resin, while, if the content exceeds 50 mol %, the copolymerization rate is low during the production of the unsaturated copolymer resin. In the case of slurry polymerization, a diene content over 50 mol % causes the problem that, since the amount of solvent-soluble by-product polymers is increased, the productivity deteriorates due to an increase in the viscosity of the polymerization system, and the unsaturated copolymer produced becomes sticky and does not maintain a resinous form.

The molecular weight of the unsaturated copolymer resin is not limited so far as the resinous form is maintained. For example, when the α-olefin used mainly consists of propylene, the molecular weight generally corresponds to a melt flow rate (MFR) of 0.001 to 1000 g/10 minutes, preferably 0.01 to 500 g/10 minutes, more preferably 0.05 to 100 g/10 minutes, which was measured in accordance with JIS-K-6758. The unsaturated copolymer resin preferably has an elasticity modulus of 500 to 80,000 kg/cm$^2$, more preferably 1,000 to 80,000 kg/cm$^2$, most preferably 2,000 to 80,000 kg/cm$^2$, which is measured according to JIS-K-7203.

Preferable examples of unsaturated copolymer resins from the viewpoint of the molecular structure thereof include the following:

(1) random copolymers of at least one α-olefin and at least one diene;

(2) block copolymers each having polymer blocks of at least one α-olefin, and random copolymer blocks of at least one α-olefin and at least one diene (the types and may be either the same as or different from those of the α-olefins in the random copolymer blocks);

(3) block copolymers each having random copolymer blocks (block a) of at least one α-olefin and at least one diene compound, and random copolymer blocks (block b) of α-olefins and dienes, in which at least one of the types, numbers and amount ratios of the α-olefins and of the dienes contained in the blocks b is different from that of the blocks a.

The term "block copolymer" represents the following copolymer. For example, "block copolymer comprising homopolymer blocks of monomer A and random copolymer blocks of monomers A and B" includes a copolymer in which the homopolymer blocks of monomer A and the random combined with each other to form the whole structure in the form of A . . . A-AABABAAAAB . . . , and a mixture of a copolymer comprising homopolymer blocks of monomer A and random copolymer blocks of monomers A and B, which blocks are chemically combined, a homopolymer of monomer A and a random copolymer of monomers A and B.

Similarly, "block copolymer comprising polymer blocks a and b" includes a block copolymer in which the polymer blocks a and b are chemically combined with each other to form the whole structure, and a mixture containing a copolymer comprising polymer blocks a and b both of which are chemically combined with each other, a polymer comprising the polymer blocks a only and a polymer comprising the polymer blocks b only. This is the same as so-called "block copolymer" synthesized by using the Ziegler-Natta catalyst.

Preferred examples of the unsaturated copolymer resins include (1) a random copolymer of propylene, 4-methyl-1,4-hexadiene and 5-methyl-1,4-hexadiene; (2) a block copolymer comprising propylene homopolymer blocks and random copolymer blocks composed of ethylene, 4-methyl-1,4-hexadiene and 5-methyl-1,4-hexadiene; (3) a random copolymer of ethylene, 4-methyl-1,4-hexadiene and 5-methyl-1,4-hexadiene; (4) a random copolymer of propylene, ethylene, 4-methyl-1,4-hexadiene and 5-methyl-1,4-hexadiene; (5) a block copolymer comprising random copolymer blocks composed of ethylene, 4-methyl-1,4-hexadiene and 5-methyl-1,4-hexadiene, and random copolymer blocks composed of propylene, 4-methyl-1,4-hexadiene and 5-methyl-1,4-hexadiene; (6) a random copolymer of propylene and 7-methyl-1,6-octadiene; (7) a block copolymer comprising propylene homopolymer blocks and random copolymer blocks composed of ethylene, propylene, 7-methyl-1,6-octadiene; (8) a block copolymer comprising propylene homopolymer blocks and random copolymer blocks composed of propylene and 7-methyl-1,6-octadiene; (9) a random copolymer of ethylene, propylene and 7-methyl-1,6-octadiene; (10) a block copolymer comprising random copolymer blocks composed of ethylene and propylene and random copolymer blocks composed of propylene and 7-methyl-1,6-octadiene; (11) a block copolymer comprising random copolymer blocks composed of ethylene and propylene, and random copolymer blocks composed of ethylene, propylene and 7-methyl-1,6-octadiene; (12) a random copolymer of 3-methyl-1-butene and 7-methyl-1,6-octadiene; (13) a random copolymer of propylene and divinylbenzene; (14) a random copolymer of ethylene and divinylbenzene; (15) a random copolymer of ethylene, propylene and divinylbenzene; (16) a block copolymer comprising propylene homopolymer blocks and random copolymer blocks composed of ethylene and divinylbenzene; (17) a block copolymer comprising propylene homopolymer blocks, and random copolymer blocks composed of propylene, ethylene and divinylbenzene; (18) a block copolymer comprising random copolymer blocks composed of propylene and divinylbenzene, and random copolymer blocks composed of ethylene and divinylbenzene; (19) a block copolymer comprising random copolymer blocks composed of propylene and divinylbenzene, random copolymer blocks composed of a propylene, ethylene and divinylbenzene; (20) a random copolymer of 3-methyl-1-butene and divinylbenzene; and the like.

The unsaturated copolymer resin used as the component (B) in the present invention may be either a single unsaturated copolymer or a mixture of an unsaturated copolymer and a polyolefin containing no diene compound. Although the mixing ratio between the unsaturated copolymer and the polyolefin containing no diene compound is not limited, the ratio is preferably within the range of from 100:0 to 10:90 in % by weight.

(II) Additional Component

The resin composition of the present invention may further contain additional components. For example, known additives such as an antioxidant, a weathering modifier, a nucleating agent, a flame retarder, a slip agent and the like can be added to polyolefin resins. A known antioxidant, weathering modifier, plasticizer, styrene resin, fluidity modifier, releasing agent and the like can also be added as additional components to polyphenylene ether resins. The addition of an organic or inorganic filler or reinforcing agent, particularly, the addition of glass fibers, mica, talc, wollastonite, potassium titanate, calcium carbonate, silica or the like, is effective for improving the rigidity, heat resistance, dimensional accuracy, dimensional stability and so on. Known various coloring agents and dispersants therefor can also be added for practical use.

In addition, the addition of a rubber component, particularly, the addition of styrene-butadiene copolymer rubber, a hydrogenation product thereof, ethylene-propylene(-diene) copolymer rubber or the like, is particularly effective for improving the impact strength of the composition. For example, when it is desired to improve the balance between the rigidity and the impact strength of the composition, a rubber component is added in an amount of 5 to 30% by wight relative to 100% by weight of the resin components of the composition.

(III) Method of Mixing the Composition

The components of the thermoplastic resin composition of the present invention may be mixed by a method of kneading by using any one of various kneaders such as a uniaxial extruder, a biaxial extruder, a Banbury mixer and the like, a method of mixing solutions or suspensions of the components and then removing the solvent or separating out the components by adding a common non-solvent and then recovering the precipitates by filtration. Although the components may be mixed in any possible mixing order, when the components are mixed by a melt kneading method, it is preferable to successively mix the components in the order of decreasing viscosity.

Methods of the present invention are illustrated with reference to the following examples, but the invention is not intended to be limited only to these following examples.

EXAMPLES

The present invention is described in detail below with reference to examples, but the scope of the invention is not limited to these examples.

1) Components

A) Polyphenylene ether resin

Poly(2,6-dimethyl-1,4-phenylene ether) resins produced on an experimental basis by Nippon Polyether Co., Ltd. were used. The values of intrinsic viscosity of the resins were respectively 0.31 dl/g and 0.51 dl/g in chloroform at 30° C. (in Table 1, respectively shown by PPE[$\eta$]=0.31, PPE[$\eta$]=0.51).

B) Unsaturated copolymer resin

Unsaturated copolymer-1

Preparation of carrier-supported catalyst 100 ml of n-heptane which was dehydrated and deoxidated was poured into a flask in which the air was sufficiently replaced by nitrogen. 0.1 mol $MgCl_2$ and 0.20 mol of $Ti(O\cdot nBu)_4$ were then introduced into the flask, followed by reaction at 100° C. for 2 hours. After the completion of the reaction, the temperature was decreased to 40° C., and 15 ml of methyl hydrogen-polysiloxane was then added to the flask, followed by reaction for 3 hours. After the completion of the reaction, the thus-produced solid substance was washed with n-heptane. As a result of component analysis of a part of the product, the Ti content was 15.2% by weight, and the Mg content was 4.2% by weight. 100 ml of dehydrated and deoxidated n-heptane was then added to a flask in which the air was sufficiently replaced by nitrogen, and the synthesized substance was then added to the flask in an amount of 0.03 mol in terms of Mg atom. 0.05 mol of $SiCl_4$ was then added to the flask at 30° C. for 15 minutes, followed by reaction at 90° C. for 2 hours. After the reaction had been completed, the reaction product was washed with purified n-heptane. A mixture of 25 ml of n-heptane and 0.004 mol of ortho-$C_6H_4(COCl)_2$ was then added to the flask at 50° C., and 0.05 mol of $SiCl_4$ was added to the flask, followed by reaction at 90° C. for 2 hours. After the completion of the reaction, the reaction product was washed with n-heptane to form a catalyst. The Ti content was 2.05% by weight.

Production of copolymer

After the air in a 10-1 autoclave had been replaced by propylene, 3.3 l of n-heptane was charged therein, and 1.0 g of triethylaluminum, 10.44 g of diphenyl dimethoxy silane and 0.7 g of the carrier-supported catalyst produced by the above method were then added to the autoclave in this order. After 800 Nml hydrogen had been added to the autoclave, propylene was supplied to the autoclave under pressure and then agitated at 50° C.

and 0.5 kg/cm$^2$G. 750 ml of 7-methyl-1,6-octadiene was then added to the autoclave, and the temperature was then increased while propylene was supplied to the autoclave under pressure. Polymerization was effected for 5 hours at 65° C. and 5.5 kg/cm$^2$G. After the catalyst had then been inactivated by n-butanol, the catalyst residue was extracted by water, and the copolymer produced was recovered by centrifugation and then dried. As a result, 1940 g of dry powder was obtained. The bulk density of the copolymer was 0.50 g/cc, and the amount of the amorphous polymer was 54 g.

The thus-produced copolymer had an MFR (230° C.) of 1.4 g/10 minutes and showed a melting peak at 149° C. in DSC measurement. The H$^1$-NMR analysis of the copolymer showed that the content of 7-methyl-1,6-octadiene was 2.7 mol % and that the copolymer also had no diene monomer unit chains and that it was a 1,2-addition structure.

Unsaturated copolymer-2

Copolymerization was performed by the same method as that employed in Production Example 1 with the exception that 0.8 g of carrier-supported catalyst was added, and 350 ml of 7-methyl-1,6-octadiene was further added after it had been kept at 65° C. for 1.5 hours. As a result, 1820 g of dry powder was obtained, and 131 g of amorphous polymer was obtained.

The thus-obtained powder had a bulk density of 0.46 g/cc, and the copolymer had an MFR (230° C.) of 1.7 g/10 minutes and showed a melting peak at 148° C. in DSC measurement. The content of 7-methyl-1,6-octadiene was 4.2 mol %. The copolymer also had no diene monomer unit chains and that it was a 1,2-addition structure.

Unsaturated copolymer-3

After the air in a 10-1 autoclave had been replaced by propylene, 4.0 l of mixture of 4-methyl-1,4-hexadiene and 5-methyl-1,4-hexadiene with a ratio of 8:2 (molar ratio) was charged in the autoclave. 9 g of trimethylaluminum and 4 g of the carrier-supported catalyst prepared by the above-mentioned method were then added to the autoclave in this order. After 5 Nl of hydrogen had been added, propylene was supplied to the autoclave under pressure and then agitated at 25° C. and 2.5 kg/cm$^2$G. The temperature was then increased and kept at 65° C. at 8 kg/cm$^2$G while propylene being supplied under pressure. After polymerization had been effected for 2 hours, the product was treated by the same method as that employed in Production Example 1 to obtain 1140 g of dry powder which had a bulk density of 0.41 g/cc.

The thus-produced copolymer had an MFR (230°) of 2.2 g/10 minutes and showed a melting peak at 152.0° C. in DSC measurement. The H$^1$-NMR analysis showed that the content of methyl-1,4-hexadiene was 3.8 mol % and that the copolymer produced had no diene monomer unit chains and that it was a 1,2-addition structure.

Unsaturated copolymer-4

After the air in a 1-1 autoclave had been replaced by propylene, 500 ml of n-heptane, 30 ml of divinylbenzene, 234 mg of diethylaluminum chloride and 100 mg of titanium trichloride (manufactured by Toyo Stofer Co.) were added to the autoclave in this order. 450 ml of hydrogen was then added to the autoclave, and propylene was then supplied under pressure. Polymerization was then effected for 3 hours at 65° C. and 7 kg/cm$^2$G.

After the catalyst used had been then inactivated by n-butanol, the catalyst residue was extracted with water and filtered out to recover a copolymer. The copolymer recovered was then dried to obtain 89.5 g of dry powder. The amount of the amorphous polymer obtained was 3.13 g.

The thus-obtained copolymer had an MFR (230° C.) of 2.1 g/10 minutes and showed a melting peak at 160° C. in DSC measurement. Ultraviolet absorption spectroscopy showed that the divinylbenzene content was 0.20 mol %.

Unsaturated copolymer-5

After the air in a 1-1 autoclave had been replaced by propylene, 400 ml of mixture containing 4-methyl-1,4-hexadiene and 5-methyl-1,4-hexadiene at a ratio of 8:2 (molar ratio) was charged in the autoclave. 0.15 g of triethylaluminum and 4 mg of Mg-supported Ti catalyst were then added to the autoclave in this order. After the hydrogen concentration of the vapor phase had been adjusted to 30 vol %, the temperature was increased while ethylene was supplied under pressure. Polymerization was then effected for 5 hours at 65° C. and 8 kg/cm$^2$G. After the catalyst had been inactivated by n-butanol, the copolymer produced was recovered and then dried. As a result, 106 g of dry powder was obtained.

The thus-obtained copolymer had an MFR (190° C.) of 2.9 g/10 minutes and showed a melting peak at 128° C. in DSC measurement. The H$^1$-NMR analysis showed that the content of methyl-1,4-hexadiene was 4.3 mol % and that the copolymer had no diene monomer unit chains and that it was a 1,2-addition structure.

Propylene resin

Propylene (trade name, Mitsubishi Polypro TA8) manufactured by Mitsubishi Petrochemical Co. was used.

Polyethylene (trade name, Mitsubishi Polyethy EY40) manufactured by Mitsubishi Petrochemical Co. was used.

2) Measurement and Evaluation Method

The physical property values and various properties of each of the examples and comparative examples below were measured and evaluated under the following conditions:

(1) Dispersion state

A portion was cut from the test piece used for evaluating the physical property values of each of the examples and comparative examples. The portion was ion etched and then subjected to observation of the size dispersed particles by using a scanning electron microscope (S-2400 manufactured by Hitachi, Ltd.).

(2) Izod impact strength

Three 2 mm thick test pieces were fixed one on top of the other with cellophane tape and Izod impact strength without notches was measured by using an Izod impact tester manufactured by Toyo Seiki Seisaku-sho according to ISO R180-1969(JIS K7110).

(3) Resistance to organic solvents

The resistance to organic solvents was measured according to Bergen's ¼ elliptic method (SPE Journal, 667, 1962). Namely, a test piece having a thickness of 2 mm was fixed to a ¼ elliptic jig having a long axis of 240 mm and a short axis 80 mm and then immersed in commercially available gasoline for 5 minutes. The minimum distortion which produced cracks was considered as critical distortion.

The marks shown in Table 1 respectively indicate the following evaluation criteria:

⊚: (very good) no cracking occurred;
○: (good) critical distortion of 1.5% or more;
Δ: (medial) critical distortion of 1.0 to 1.5%:
X: (poor) critical distortion of less than 1.0%.

(4) Kneading of Resin Composition

The predetermined amounts of components shown in Table 1 were molten and kneaded at 280° C. by a laboplastmill kneader manufactured by Toyo Seiki Seisaku-sho to form a composition. The composition was ground into powder by using a grinder.

(5) Formation of Test Piece for Measurement and Evaluation of Physical Properties A sheet molded under pressure at 280° C. by using a hydraulic compression molding machine manufactured by Toyo Seiki Seisaku-sho was used as a test piece.

EXAMPLES 1 to 8 and COMPARATIVE EXAMPLES 1 to 3

The components were mixed at each of the ratios shown in Table 1 to form a composition. Each of the compositions formed was evaluated with respect to the physical properties thereof. The results obtained are shown in Table 1.

7-methyl-1,6-octadiene and having an elastic modulus of 2,000 to 80,000 kg/cm².

2. The composition according to claim 1, wherein said unsaturated copolymer resin contains 0.05 to 30 mol % of 7-methyl-1,6-octadiene.

3. The composition according to claim 1, wherein said α-olefin is propylene.

4. The composition according to claim 1, wherein said polyphenylene ether resin used as said component (A) is a homopolymer or copolymer having the following formula:

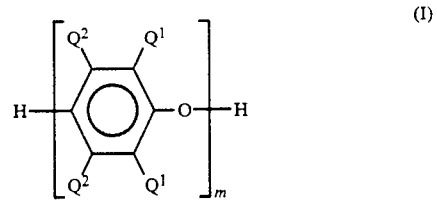

where $Q^1$ is a halogen atom, a primary or secondary alkyl group, a phenyl group, an aminoalkyl group, a hydrocarbon oxy group or a halohydrocarbon oxy group; $Q^2$ is a hydrogen atom, a halogen atom, a primary or secondary alkyl group, a phenyl group, a haloalkyl group, a hydrocarbon oxy group or a halohydrocarbon oxy group; and m denotes a number of 10 1 or more.

5. The composition according to claim 1, wherein said polyphenylene ether resin is poly(2,6-dimethyl-1,4-

TABLE 1

|  | Example |  |  |  |  |  |  |  | Comparative example |  |  |
|---|---|---|---|---|---|---|---|---|---|---|---|
|  | 1 | 2 | 3 | 4 | 5 | 6 | 7 | 8 | 1 | 2 | 3 |
| Components (wt %) |  |  |  |  |  |  |  |  |  |  |  |
| PPE[η] = 0.31 | 50 | 50 | 50 | 50 | 50 | — | 30 | 50 | 50 | — | 50 |
| PPE[η] = 0.51 | — | — | — | — | — | 50 | — | — | — | 50 | — |
| Unsaturated copolymer 1 | 50 | — | — | — | — | 50 | — | — | — | — | — |
| Unsaturated copolymer 2 | — | 50 | — | — | — | — | — | — | — | — | — |
| Unsaturated copolymer 3 | — | — | 50 | — | — | — | — | — | — | — | — |
| Unsaturated copolymer 4 | — | — | — | 50 | — | — | 70 | — | — | — | — |
| Unsaturated copolymer 5 | — | — | — | — | 50 | — | — | 25 | — | — | — |
| PP | — | — | — | — | — | — | — | — | 50 | 50 | — |
| PE | — | — | — | — | — | — | — | 25 | — | — | 50 |
| Physical Properties |  |  |  |  |  |  |  |  |  |  |  |
| Izod impact strength (without notches) (kg · cm/cm²) | 45.0 | 49.1 | 18.2 | 11.8 | 48.4 | 6.7 | 17.7 | 41.1 | 5.2 | 4.2 | 6.3 |
| Dispersion state (μ) | 1~3 | 1~3 | 2~10 | 1~8 | 5~30 | 2~15 | 1~3 | 5~30 | >100 | >100 | 10~50 |
| Resistance to organic solvents | ○ | ○ | ○ | ○ | Δ | ○ | ○ | Δ | X | X | X |

As shown in the Examples and Comparative Examples, the mixing of unsaturated copolymer resin (B) and polyphenylene ether resin (A) significantly decreases the size of dispersed particles, as compared with the case which uses no unsaturated copolymer. This improves the compatibility between the components (A) and (B) which are essentially incompatible and thus enables the formation of a resin composition having excellent impact resistance and mechanical strength.

What is claimed is:

1. A thermoplastic resin composition, comprising the following components (A) and (B):
   a) component (A) which is 10 to 90% by weight of a polyphenylene ether resin, and
   b) component (B) which is 90 to 10% by weight of an unsaturated copolymer resin obtained by copolymerizing at least one α-olefin having 2 to 12 carbon atoms and 7-methyl-1,6-octadiene, said unsaturated copolymer resin containing 0.01 to 50 mol % of phenylene ether).

6. The composition according to claim 1, wherein said unsaturated copolymer used as said component (B) has a number average molecular weight of 3,000 more and wherein at least one of the melting point and glass transition temperature of the copolymer is 40° C. or more.

7. The composition according to claim 2, wherein said unsaturated copolymer resin contains 0.5 to 15 mol % of 7-methyl-1,6-octadiene.

8. The composition according to claim 1, wherein said unsaturated copolymer resin has a melt flow rate (MFR) of 0.05 to 100 g/10 minutes.

9. The composition according to claim 1, wherein said most 90% by weight of unsaturated copolymer resin used as said component (B) is replaced by polypropylene or polyethylene.

10. The composition according to claim 4, wherein $Q^1$ and $Q^2$ are each independently methyl, ethyl, n-propyl, n-butyl, n-amyl, isoamyl, 2-methylbutyl, n-hexyl, 2,3-diemthylbutyl, 2,3- or 4-methylpentyl, heptyl, isopropyl, sec-butyl or 1-ethylpropyl groups.

11. The composition according to claim 4, wherein $Q^1$ is a lower alkyl or phenyl group, and $Q^2$ is a hydrogen atom.

12. The composition according to claim 1, which is comprised of 2,6-dimethyl-1,4-phenylene ether units and 2,3,6-trimethyl-1,4-phenylene ether units.

13. The composition according to claim 1, wherein said polyphenylene either resin has an intrinsic viscosity in chloroform at 30° C. of about 0.05 to 0.8 dl/g.

* * * * *